G. H. GILMAN.
STONEWORKING MACHINE.
APPLICATION FILED FEB. 20, 1908.

1,228,661.

Patented June 5, 1917.
6 SHEETS—SHEET 2.

Witnesses:
Horace H. Crossman
Robert H. Kammler

Inventor:
George H. Gilman
by Emery Booth, Attys.

G. H. GILMAN.
STONEWORKING MACHINE.
APPLICATION FILED FEB. 20, 1908.

1,228,661.

Patented June 5, 1917.
6 SHEETS—SHEET 5.

Witnesses:
Horace H. Crossman
Robert H. Kammler

Inventor:
George H. Gilman.
by Emery & Booth
Attys

UNITED STATES PATENT OFFICE.

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

STONEWORKING-MACHINE.

1,228,661.     Specification of Letters Patent.     Patented June 5, 1917.

Application filed February 20, 1908. Serial No. 416,843.

*To all whom it may concern:*

Be it known that I, GEORGE H. GILMAN, a citizen of the United States, residing at Claremont, in the county of Sullivan, State of New Hampshire, have invented an Improvement in Stoneworking-Machines, of which the following description, in connection with the accompanying drawings, is a specification, like letters on the drawings representing like parts.

This invention relates to stone working machines, the particular embodiment thereof, which is here illustrated, being a machine intended particularly for the dressing or surfacing of stone.

The invention will be best understood by reference to the following description when taken in connection with the accompanying illustration of one specific embodiment thereof, while its scope will be more particularly pointed out in the appended claims.

Figures 1, 2:
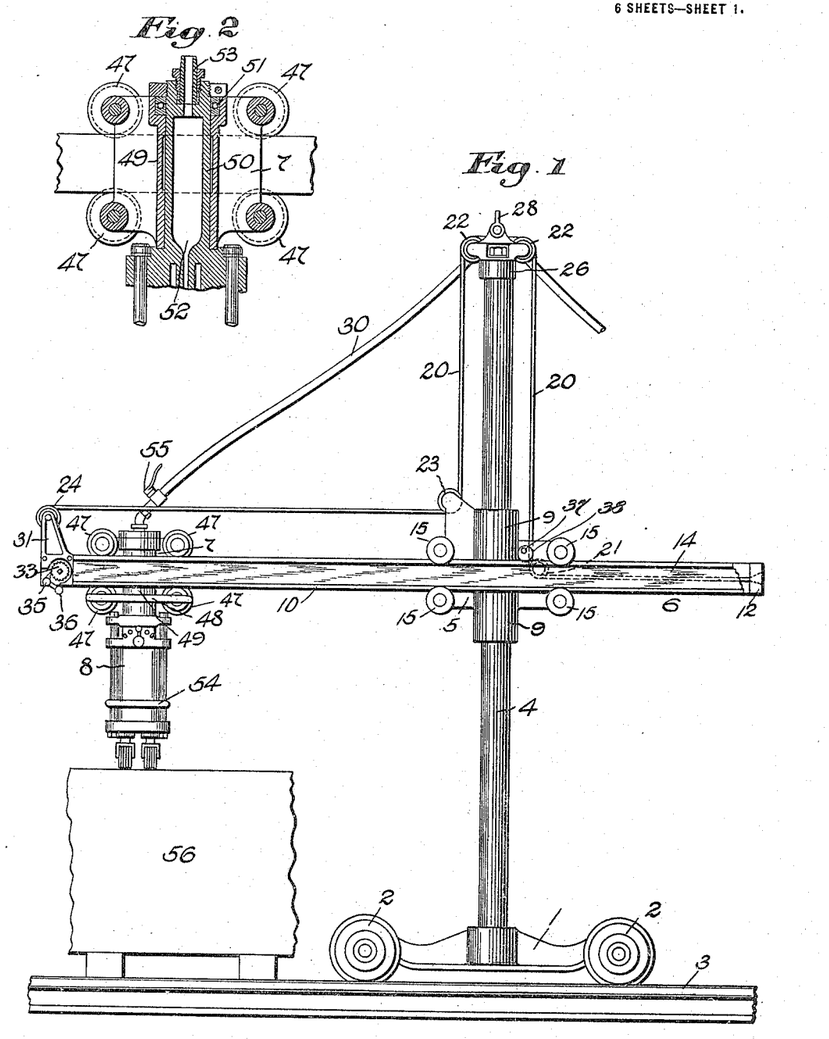
Figure 1 is a side elevation of a surfacing machine embodying one form of my invention.
Fig. 2 is a longitudinal section in elevation, on an enlarged scale, showing the tool holder carriage.
Figure 3:
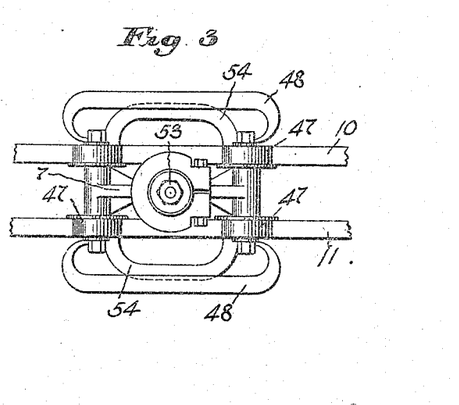
Fig. 3 is a plan view of the tool holder carriage.
Figure 4:
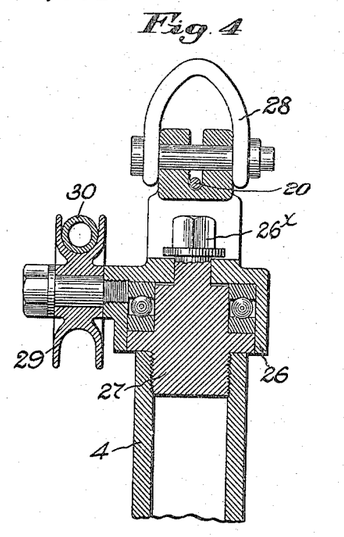
Fig. 4 is a sectional elevation taken through the cap or crown piece at the top of the standard and at right angles to the view shown in Fig. 1.

Referring to the drawings and particularly to Fig. 1, the machine is mounted upon any suitable support, the latter herein comprising a portable base or truck 1 mounted upon the wheels 2, upon which the apparatus may be moved along the track 3.

In the illustrated form shown the base 1 sustains the upright supporting column 4 which herein is fixedly secured upon the base. The column 4 is preferably of tubular formation to secure the maximum strength with the minimum of weight and the same sustains and guides a main supporting carriage 5 which may be raised or lowered upon the standard at the will of the operator by devices to be described. The carriage 5 supports the laterally extending supporting arm, herein in the form of a radial arm 6, near the outer end of which is mounted the tool carriage 7, which carries the stone surfacing or dressing tool 8. In the present machine the construction of the parts are such that the radial arm may be raised or lowered to adjust the vertical position of the arm and tool, or its effective length may be increased or shortened relatively to the supporting standard, while, at the same time, the tool may be swung about the support in the arc of a circle, as requirements of the work may demand.

In addition to the adjustment of the effective length of the radial arm the tool carriage itself is adapted to move along the same, thereby to permit the operator to quickly shift or adjust the position of the tool for slight differences in the position of the latter over the desired radial distance from the central support.

Figure 8:
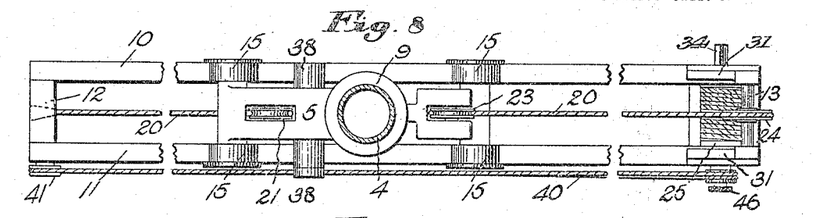
Fig. 8 is a plan view of the main supporting carriage shown in Fig. 1.
Figure 9:
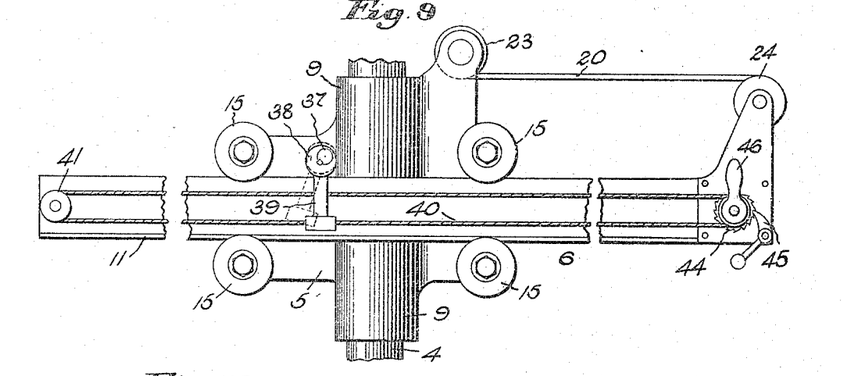
Fig. 9 is a side elevation of the same.

Although the swinging adjustment of the tool about the central support may be obtained in other ways, in the present construction the main supporting carriage 5 is mounted so that it can both turn about and move vertically up and down the column 4. Referring to Figs. 1, 8 and 9, the carriage 5 is provided with separate sleeve portions 9 which may embrace the tubular support 4 with sufficient clearance, so that the carriage may turn freely about the same or move freely up and down, but sufficiently close to maintain the arm 6 substantially firm and rigid. The radial supporting arm 6 herein consists of a frame-work composed of separated supporting members 10 and 11 (Fig. 8), each comprising a channel iron extending lengthwise the arm, and transverse distance or separating members 12 and 13 at opposite ends of the arm, the whole constituting a rectangular frame which incloses or embraces the supporting column. Each channel iron is preferably filled with wood 14 or other suitable material so as to deaden and reduce the vibration consequent on the employment of the tool 8. Each channel iron of the supporting arm is confined between pairs of upper and lower rollers 15 journaled upon the carriage 5, the distance between the rollers being such that while the arm is fixedly and rigidly held in the desired horizontal position upon the carriage it may be slid longitudinally or radially with reference to the supporting column, at will upon the roller bearing supports thus afforded.

If it is desired to secure the radial arm in fixed position relatively to the carriage 5, means are herein provided whereby the two may be clamped together. For this purpose the carriage (Figs. 8 and 9) is provided with a rock shaft 37 journaled transversely in the carriage and provided at each outer end with eccentric cam sleeves 38 keyed thereto. Such shaft is provided with the depending arm 39 which, when turned to the full line position represented in Fig. 9, wedges or pinches against the channel irons and is effective in clamping or locking the supporting arm to the carriage. When the cams and the arm are turned to the position represented in dotted line, however, the binding effect of the cams is relieved and the supporting arm is free to be adjusted in or out.

Figure 6:
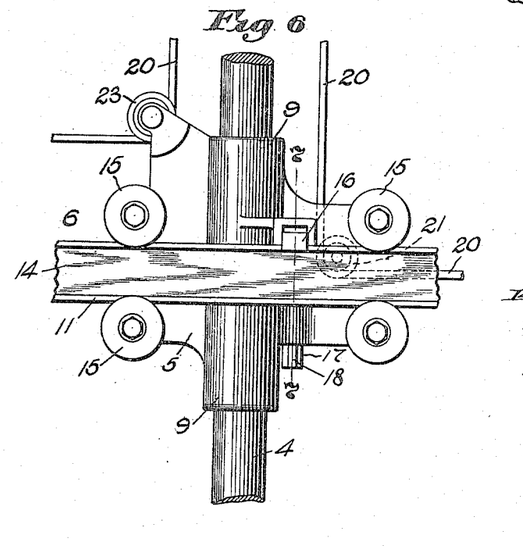
Fig. 6 is a side elevation of a modified form of main supporting carriage on a somewhat enlarged scale.
Figure 7:
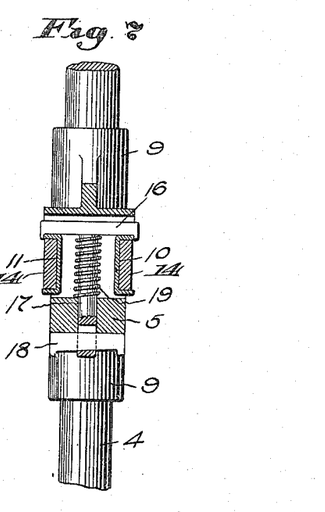
Fig. 7 is a section on the line 7—7 in Fig. 6.

The particular construction of clamping means for holding the arm is not essential. In Figs. 6 and 7 I have shown a modified construction of supporting carriage. Herein the carriage is provided with the T-shaped shoe or clamping member 16 which overlies the upper flange of each channel iron. The clamp has a depending leg 17 provided with an exposed transverse slot adapted to receive the tapered key 18 so that if the latter is forced into the slot against the adjacent portion of the carriage frame the clamp will be drawn down against the channel irons and the latter held fixed between the clamp and the lower set of rollers 15. A spring 19 is preferably employed to lift the clamp when out of use so as to free it from the channel irons.

In the use of a surfacing machine it is frequently desirable for the operator to adjust the height of the supporting arm and the tool without leaving his position adjacent the tool. Provision is here made for raising or lowering the main supporting carriage 5 by means which are located at or adjacent the effective end of the supporting arm 6, so that the operator, while adjacent the tool and the work and without leaving the same, can raise or lower the arm to the precise position desired.

Figure 5:
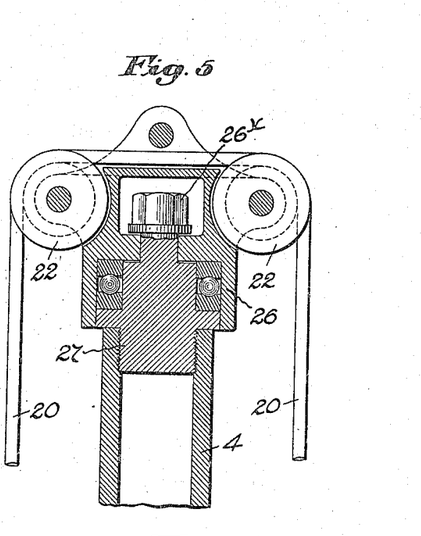
Fig. 5 is a similar section taken in a plane transverse to that of Fig. 4.

While other means may be employed for this purpose in the illustrated form of the invention, the supporting carriage 5 is both sustained and adjusted by means of a rope or cable 20. One end of the cable is fixedly secured to the distance member 12 at the end of the supporting arm. It thence passes to and about a guiding sheave 21 upon the supporting carriage, thence up and over a pair of guiding sheaves 22 at the top of the column (see Fig. 5), thence down about the second supporting sheave 23 upon the supporting carriage, thence to the opposite end of the arm about the guiding sheave 24 and down and about a rope-winding drum 25, at which point it may be taken up or let out to raise or lower the carriage.

With the lifting rope 20 attached in this manner the supporting arm may be moved in and out longitudinally between the rollers 15 upon the carriage without in any way affecting the vertical adjustment of the latter, for the rope will run freely over the guiding sheaves 21 and 23 without changing the height of the arm. Likewise the carriage 5 may be raised or lowered without in any wise affecting the longitudinal adjustment of the supporting arm 6.

At the top of the column the guiding sheaves 22 are journaled upon a crown piece 26, the latter revolubly mounted upon ball bearings carried by the plug or stud 27 threaded into the top of the column. The crown piece 26 is therefore perfectly free to turn and adjust itself to any position about the axis of the column in response to the swinging adjustment of the radial supporting arm, and such swinging adjustment may be effected by the operator by merely pulling the tool toward him or pushing the same away from him. The crown piece 26 is preferably provided with an eye 28 pivotally secured to the top of the same, so that the entire machine may be lifted about from one point to another by suitable hoisting mechanism. At the side of the crown piece and at right angles to the rollers 22 is provided the sheave 29 journaled upon a stud secured to the crown piece, which sheave is deeply grooved so as to be capable of guiding and receiving the hose 30 used to convey the pressure fluid to the working tool. The crown piece 26 is prevented from lifting away from the plug 27 by the nut 26ˣ when the machine is hoisted for conveyance from place to place by the eye 28, as above described.

Figure 10:
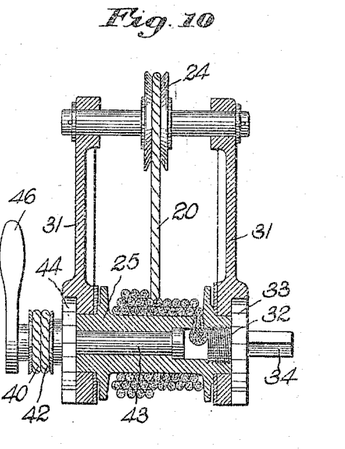
Fig. 10 is a transverse sectional elevation taken through the rope-winding drum at one end of the supporting arm.

The winding drum 25 is mounted to turn in journals formed in brackets 31 secured at the end and either side of the radial arm, the guiding sheave 24 being also journaled to upper portions of said brackets. The winding drum 25 (Fig. 10) has threaded into the end thereof the stud 32 to which is attached the ratchet 33 and the squared projecting portion 34, the latter adapted to receive a suitable crank and handle, so that the drum can be turned therethrough and the rope wound on or unwound from the drum. The ratchet is engaged by the pivoted pawl 35 preventing backward movement of the drum, the pawl having a weighted tail piece 36 by which the operator can withdraw it from the teeth of the ratchet when desired.

It is frequently desirable not only to adjust the height vertically of the supporting carriage from a position at or near the tool, but also to adjust the longitudinal relation of the radial arm within the supporting carriage also from the tool supporting end of the arm. To the form of clamp represented in Figs. 1, 8 and 9, I have shown applied connections whereby the arm may be adjusted in and out from its support and clamped in such position or unclamped for further adjustment, all under control of devices extending to the end of the arm. For this purpose the depending arm 39 is attached to the endless cable or rope 40, which latter passes over a guiding sheave 41 at the rear and over a second and preferably double guiding sheave 42 at the forward end of the frame. The sheave 42 is secured to a rotatable stud 43 journaled in the winding drum 25, but freely rotatable independently thereof. To the stud 43 is also keyed a ratchet wheel 44 adapted to be engaged by the weighted pawl 45 and thereby held in any assigned position. The stud is also preferably provided with means such as a hand lever 46 by which it may be turned and the sheave 42 thereby turned to move the rope and turn the arm 39 and attached cams in one direction or the other. It is only necessary, therefore, for the operator while standing at the end of the arm and adjacent the tool to turn the hand lever 46 to unclamp the arm, whereupon it can be freely adjusted. After adjustment the hand lever can be again turned and locked by the pawl to clamp the arm in fixed position. These clamping and unclamping devices also can be controlled by the operator at any position along the radial supporting arm through manipulation of the endless cable 40.

In addition to the longitudinal movement of the arm 6 within the carriage 5 the tool-supporting carriage itself may be adjusted longitudinally upon the arm, thus affording a delicate adjustment of which the operator can readily avail himself as occasion demands in the course of his work. For this object the carriage 7 is provided with sets of upper and lower rollers 47 adapted to track with the flanges of the angle irons 10 and 11, sufficient clearance being provided to permit it to readily move longitudinally. To enable the operator to accomplish this readily there is provided at either side of the carriage the handle 48. The carriage is provided with a central supporting or sustaining sleeve member 49, within which is revolubly mounted the neck or stem 50 of the tool 8, there being provided suitable and preferably ball bearings 51, whereby the tool may be readily turned as a whole within the sleeve 49. The neck 50 is provided with a central passage 52 leading to the valve chamber or chambers of the tool 8 and is supplied with pressure fluid from the hose 30 which is connected centrally to the sleeve through the nipple 53, so that a reasonably free rotation or turning of the tool as a whole may be performed without displacing or affecting in any way the hose connection to the device.

To permit the operator to turn the entire tool at will and thereby enable him to govern the resultant alinement of the lines of cut produced by the cutting device or devices actuated by the tool, I have provided means, such as the handle 54, at either side of the tool, which the operator may grasp to turn the tool at will. The turning of the entire tool as a body within its supporting carriage and relatively to the arm and support permits the employment of a gang of tools or a plurality of cutting units which, by this operation may be simultaneously turned while the alinement of the cuts produced may be kept uniform. In the illustrated form of my invention I have employed a duplex form of pressure-fluid-actuated, piston-hammer tool having two sets of cutters or cutting units, each actuated by its own separate piston hammer and adapted to be so controlled that they may be operated in opposed step (thereby to reduce the resultant vibration), or one individually to the exclusion of the other. The admission of fluid pressure to the tool is regulated by the throttle valve 55 interposed in the line of hose 30.

Any desired valve construction may be employed for the purpose of securing a non-synchronous operation of the two cutting units, but for illustration I have herein illustrated a construction of valve which not only secures a non-synchronous operation of the hammer pistons, but maintains them in opposed step.

Figure 11:
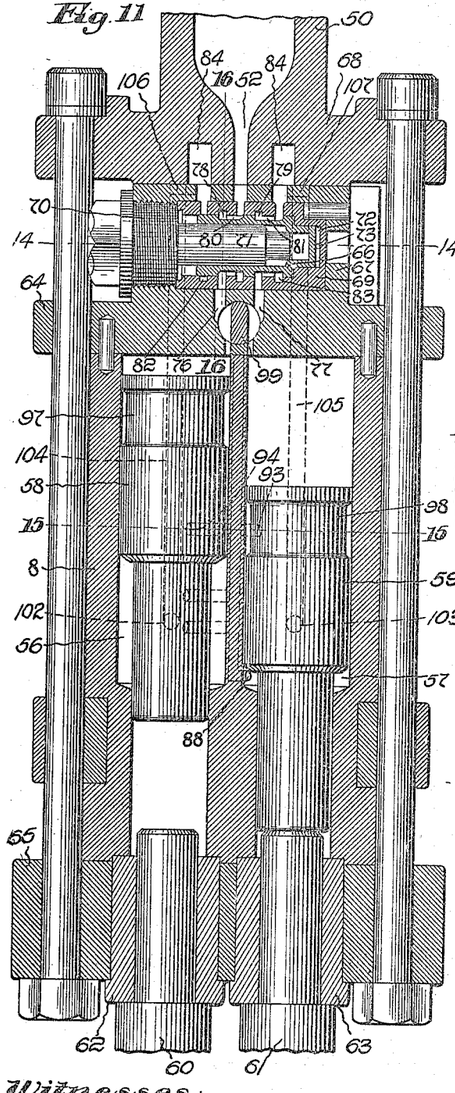
Fig. 11 is a central, sectional elevation taken through the working cylinders and controlling valve of a duplex hammer tool embodying one form of my invention.

Referring now more particularly to Figs. 11 to 24 inclusive and especially to Fig. 11, the body 8 of the tool is provided with cylinder chambers 56 and 57, within which reciprocate the pistons 58 and 59 respectively, provided with reduced striking ends adapted to strike the separate cutting tools 60 and 61 which are loosely held in the bushings 62 and 63. The tool body is provided at the rear end with the upper head 64 and at the forward end with the lower head 65.

In the illustrated form of the invention a differential pressure-actuated valve 66 is movable within the valve block 67. The latter is formed by the upper part of the upper head 64 and, in turn, is surmounted by the end piece 68 connected to the neck 50. The valve works within the suitably apertured valve bushing 69, the end of which is closed by the threaded cap 70, the latter having the plug 71 serving as a guide and support for the hollow interior of the valve. The opposite reduced closed end of the valve works within a constant pressure chamber 72, the latter connected by the passage 73 (Figs. 11 and 14) with the admission passage 52, so that the valve is constantly pressed toward the cap 70, but may be intermittently moved in the opposite direction, to the position shown in Fig. 1, by the intermittent admission of pressure fluid to the larger pressure receiving area at the opposite end of the valve between the same and the cap 70. This takes place under the control of one or the other of the two hammer pistons through one or the other intermittent pressure ports 74 and 75 (Figs. 12 and 14).

For the admission of pressure to and its exhaust from the head end of the cylinders, the cylinder 56 is provided with the passage 76 leading to the head end of the cylinder and controlled by the valve 66, and the cylinder 57 is provided with a like passage 77. The passage 76 leads into an annular groove 78 (see Figs. 11 and 16) in the valve bushing 69, and the passage 77 into a similar groove 79, and the valve is also provided with coöperating circumferential grooves 80 and 81 through which the said passages are adapted alternatively to be placed in communication with the pressure admission passage 52 as the valve is alternately moved from one position to the other.

Next adjacent the grooves 78 and 79 respectively, the valve bushing is also provided with grooves 82 and 83 which, as shown in Fig. 11, connect directly and constantly with the interconnecting exhaust passages 84, so that, with the valve in the position shown in Fig. 11, while pressure fluid is being admitted to the head end of the cylinder 56 it is being simultaneously exhausted from the head end of the cylinder 57 through the passage 77, valve groove 81, bushing groove 83 and exhaust passages 84. In the reverse position of the valve, the head end of the cylinder 56 is connected with the exhaust through the passage 76, valve groove 80 and bushing groove 82.

Figures 12, 13:
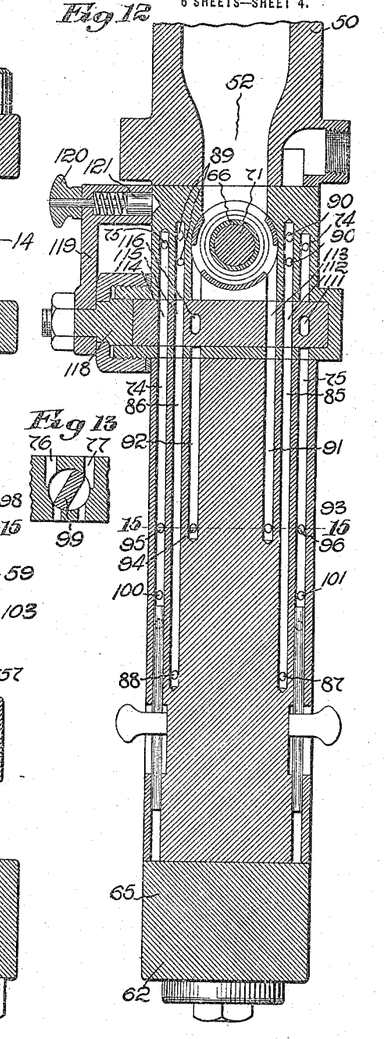
Fig. 12 is a similar section taken in a plane at right-angles to the view shown in Fig. 11.
Fig. 13 is a detail showing the regulating valve in a position different from that in Fig. 11.
Figures 14, 15, 16, 17, 18, 19, 20:
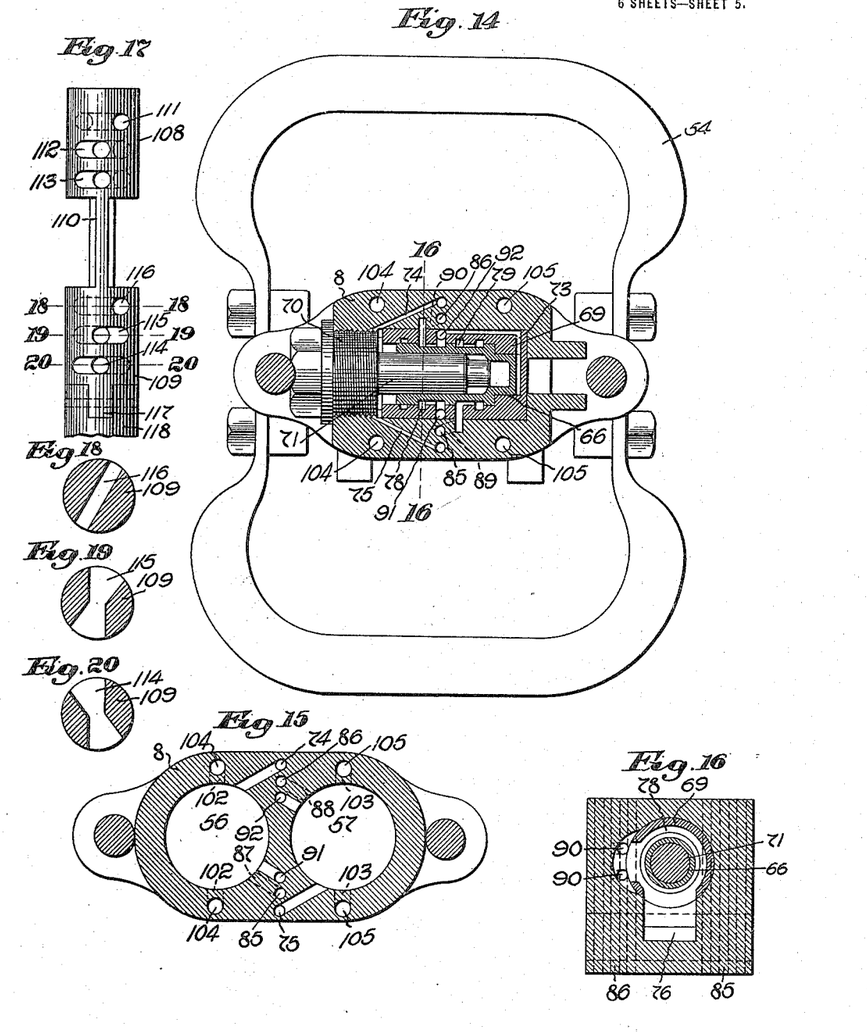
Fig. 14 is a plan in section taken on the line 14—14 in Fig. 11.
Fig. 15 is a section in plan taken through the working cylinders on the line 15—15 in Figs. 11 and 12.
Fig. 16 is a central elevation taken through the valve and valve block on the line 16—16 in Figs. 11 and 14.
Fig. 17 is a detail showing the regulating valve with a portion of the valve stem attached.
Fig. 18 is a section on the line 18—18 in Fig. 17.
Fig. 19 is a section on the line 19—19 in Fig. 17.
Fig. 20 is a section on the line 20—20 in Fig. 17.
Figure 21:
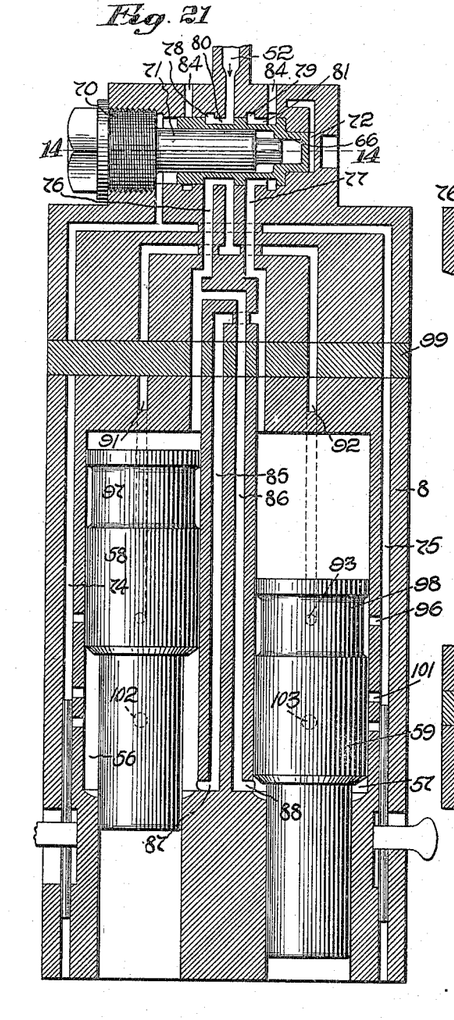
Fig. 21 is a general diagrammatic view showing a development of the pressure passages relatively to the controlling and regulating valves.

The admission of pressure to and exhaust from the opposite or tool end of the cylinders 56 and 57 respectively, is controlled through the tool and pressure passages 85 and 86 which, as represented in Figs. 12, 14 and 15, extend longitudinally in the walls of the tool body between the piston chambers, and enter their respective cylinders through the ports 87 and 88 at the lower ends thereof.

The tool end pressure passages 85 and 86 extend upwardly through the cylinder head and valve block (see Figs. 12, 14 and 16) where they have direct connection with the annular grooves 78 and 79 respectively, by one or more horizontal passages 89 and 90 (see Figs. 14 and 16), so that, when the passage 76 is opened to the admission passage 52 by the valve 71, the tool end pressure passage 86 for the tool-end of the other cylinder is simultaneously opened to the admission, and when the passage 76 is opened to the exhaust, pressure fluid is simultaneously exhausted from the tool-end of the opposite cylinder. In other words, the pressure controlling passage for the tool-end of each cylinder is so associated with the passage for the head end of the other cylinder that reverse pressure conditions invariably prevail at the corresponding ends of the two cylinders during the operation of the instrument, thereby insuring the movement of the two hammer pistons in opposed step.

For periodically reversing the controlling valve, constant pressure passages 91 and 92 are provided for the cylinders 56 and 57 respectively opening into their cylinders through ports 93 and 94 respectively, the latter being located at about the same position lengthwise the cylinders as the two ports 95 and 96 which open from the intermittent pressure passages 74 and 75 into the cylinders 56 and 57 respectively.

The pistons 58 and 59 are provided with the respective grooved portions 97 and 98, so that the intermittent pressure port in each cylinder is placed in communication with its constant pressure port when its piston approaches the limit of its downward movement although, as will more fully appear, when the two cutting units are operating jointly, reversal of the controlling valve is effected by the intermittent pressure port of one cylinder alone, the intermittent pressure port for the remaining cylinder being cut off from the controlling valve, as will more fully appear, by the regulating valve 99, which may be employed to throw out of operation one of the two cutting units, while continuing the operation of the remaining one.

In addition to the ports 95 and 96 the intermittent pressure passages are also provided with ports 100 and 101 opening into their respective cylinders below the ports 95 and 96, these being employed to exhaust the pressure fluid from the intermittent pressure area of the valve.

The conditions under which the cutting units operate simultaneously will be best understood by reference to the diaphragm of passages shown in Fig. 1 where the passages 75 and 92 are shown opened, and the passages 74 and 91 closed by the regulating valve 99. Pressure fluid is then admitted through the intermittent pressure port 96 to the larger differential area of the valve near the end of the forward movement of the piston 59, thereby moving the valve from the position shown in Fig. 22 to that shown in Fig. 21. This, as above described, reverses the movement of the piston in each cylinder. On rearward movement of the piston 59 the port 101 in the intermittent pressure passage 75 is soon uncovered and, the forward end of the cylinder 57 being at that time open to the exhaust (as will be explained), the pressure fluid is exhausted from the differential area of the valve and the latter moves again to the position shown in Fig. 22 to reverse the movements of the two pistons.

To exhaust the forward ends of the cylinders ports are provided which are uncovered in each cylinder by its respective piston on rearward movement. The cylinder 56 is provided with a pair of exhaust ports 102, and the cylinder 57 with similar ports 103, the former connected to exhaust passages 104, and the latter to exhaust passages 105, which passages extend lengthwise the cylinder and valve block outside of the control of the regulating valve 99, and connect at their ends through grooves 106 and 107 respectively (see Fig. 11) with the exhaust passage 84.

Figure 22:
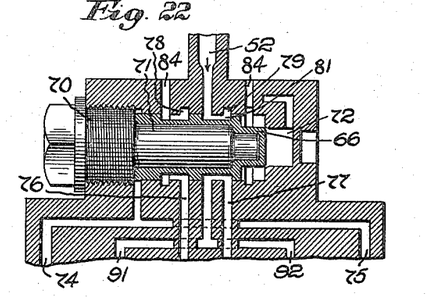
Fig. 22 shows the controlling valve in a reverse position from that shown in Fig. 21.

The complete operation of the tool will now be understood. Under the conditions represented in Fig. 21, the piston 59 is at the forward end of its stroke, having delivered its blow again to its tool. The reduced piston portion 98 has already opened the intermittent pressure port 96 to the constant pressure port 93 and caused the reversal of the valve. This has opened the head end of the cylinder 57 to the exhaust passage 84 through the passage 77, and has also opened the forward end of the cylinder 57 through the port 88, and the passage 86 to the admission passage 52. In the cylinder 56 the head end passage 76 has been opened to the admission, while the tool end passage 85 through its port 87 has opened to the exhaust, the direction of transference of fluid pressure being represented by arrow heads appearing in the said figure. On the subsequent upward stroke of the piston 59, and the accompanying downward stroke of the piston 58, the exhaust port 103 is soon uncovered and followed by the uncovering of the intermittent pressure port 101, this serving to exhaust pressure fluid from the larger area of the valve and permit reversal of the same to the position shown in Fig. 22. Pressure fluid is then admitted to the head end of the cylinder 57, and the forward end of the cylinder 56, as represented by Fig. 22.

Figure 23:
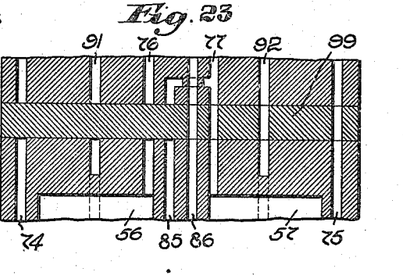
Fig. 23 shows the regulating valve in another position and corresponding to the position shown in Fig. 13.

If it is desired to throw the piston 58 out of operation while still continuing the action of the piston 59, the regulating valve 99 is turned to produce a condition depicted in Fig. 23 wherein the pressure fluid supply passsages 76 and 85 for the cylinder 56 are closed by the regulating valve. This cuts out of operation entirely the piston 58, the piston 59, however, operating as a single hammer tool, the actuation of the controlling valve 71 being then effected in the usual manner and as above described.

The regulating valve 99 may be of any suitable construction and located in any selected position in the tool, but herein it is constructed as shown in Figs. 17 to 20 inclusive and arranged transversely the tool below the valve 71, as shown in Fig. 12. The valve is provided with two piston or barrel portions 108 and 109 connected by an intermediate flat portion 110. The latter lies adjacent the passages 76 and 77 in the valve block, as best shown in Figs. 11 to 13, so that it may be employed to maintain both passages open (Fig. 11), or close one or the other of the passages (Fig. 13).

The barrel portion 108 is provided with apertures 111, 112, 113, which, with the valve in position, aline with the passages 75, 85 and 91 respectively. The barrel portion 109 likewise is provided with apertures 114, 115 and 116 adapted to aline with the passages 74, 86 and 92 respectively. The shape of the apertures 111 and 116 is shown in Fig. 18; the shape of the aperture 115 in Fig. 19, and the shape of the apertures 112, 113 and 114 in Fig. 20.

Figure 24:
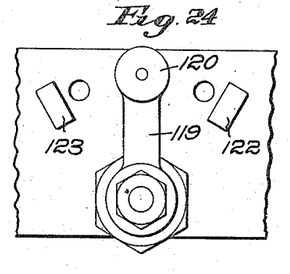
Fig. 24 is a partial side elevation of the duplex tool in Fig. 11 showing the regulating valve handle.

The end of the barrel 109 of the valve is provided with a projection 117 which is embraced by the forked end of the valve stem 118, the latter passing through an aperture in the threaded cap (Fig. 12), and being provided with the external regulating lever 119 (Fig. 24). The lever is provided with a thumb or finger piece 120 carrying a spring pressed pin 121 (Fig. 12) adapted to engage with any one of three notches formed in the exterior face of the valve block (Fig. 24) whereby it may be moved to a central position, or again the stop 122 to throw out of operation the piston 58, or again the oppositely disposed stop 123 which serves to throw out of operation both the piston 58 and the piston 59.

I have herein referred more particularly to those features and functions of the valve and tool which are of particular importance in connection with a machine of the character herein set forth. These, as well as other features of the valve and tool are claimed broadly in a co-pending application, being claimed herein only in combination with the features of the machine in connection with which they are utilized.

It will be obvious that, while I have described a specific form of tool and valve, such specific description is for illustrative purposes only, and the constructional features thereof may be widely varied without departing from the spirit of the invention.

In the employment of this apparatus the operator, having adjusted the arm and the main supporting carriage, by grasping the handle 48 with one hand and the handle 54 with the other can turn the tool with its several sets of cutters about a vertical axis of movement on the tool carriage, and, at the same time, can adjust the tool carriage in or out along the arm and swing the arm about the supporting column as a center, so that the tool may be guided in any desired resultant path of movement made up of the components of these three adjustments.

In re-adjusting the apparatus the main supporting carriage may be raised or lowered as described by applying a hand crank to the shaft 34 while the radial arm may be adjusted longitudinally, also as described, by manipulating the hand lever 46, all without the necessity of the operator leaving his position at the outer end of the arm, which position is ordinarily taken with the block of stone 56 between him and the standard.

The efficiency of an apparatus of this kind is increased by the rigidity with which the tool can be sustained on its overhanging laterally extending support, so that as the latter is swung over the surface of the stone the vertical height of the tool is not altered. This rigidity or firmness is affected to a considerable extent by the vibratory effect produced by the ordinary tool due to the reciprocatory movement of the piston hammer. In the present apparatus this vibratory effect is materially diminished by the provision of the two cutting units operating in non-synchronous relation and especially is it diminished when operating in opposed step, so that the overhanging arm is subjected to less displacement through the action of the tool and the apparatus, therefore, correspondingly more effective.

While I have herein shown and described one form of my invention for illustrative purposes, it will be understood that the invention is not limited either to the particular application thereof herein made, or to the construction and details shown, or the form or relative arrangement of parts, but that extensive modifications may be made therein without departing from the spirit of the invention.

I claim—

1. In an apparatus of the class described, the combination with a central support, a radial tool-supporting member adapted to swing about said central support, said member being longitudinally adjustable relatively to said support, holding means for holding said member longitudinally fixed, and controlling means for rendering the same effective or ineffective at will, said controlling means being controllable at a point relatively remote from said central support, said holding means acting to hold said member in any given position of longitudinal adjustment.

2. In an apparatus of the class described, the combination with a central support, a tool-supporting member longitudinally adjustable upon said central support for varying its effective length, means to hold said member fixed in any given position of longitudinal adjustment, and controlling means for rendering said holding means effective or ineffective and located at or adjacent the tool-carrying end of said tool-supporting member.

3. In an apparatus of the class described, the combination with a central support, of a tool-carrying-supporting arm longitudinally adjustable thereon, locking means for locking the same in any given position of longitudinal adjustment, a controlling member adjacent one end of said arm for rendering said locking means effective or ineffective at will, and connections between said controlling member and said locking means.

4. A stone surfacing machine having a base, an upright standard, a sleeve mounted to turn and slide on said standard, a tool-carrying arm supported by said sleeve, a pressure-fluid-operated, percussive, cutting tool carried by said arm, means permitting the longitudinal adjustment of said arm to vary the effective radial distance of the tool therefrom, a clamp to hold said arm fixed with relation to said sleeve, and a connection controlling said clamp and extending lengthwise said arm toward said tool.

5. A stone surfacing machine having the upright standard 4, the tool-carrying arm 6, the carriage 9 mounted to turn and slide on the standard and provided with rollers 15, means for longitudinally adjusting the arm relatively to the carriage, a clamp for clamping the arm to the carriage, and the connection 40 extending toward the end of the arm.

6. In a stone surfacing machine, the combination with a pressure-fluid-operated, percussive cutting tool, of a central support, a sleeve mounted to turn and slide on said support, a tool-carrying supporting member carried by said sleeve and overhanging said central support, means permitting longitudinal adjustment of the same relatively to said central support for varying the effective length of said tool-carrying member, means for holding said tool carrying member longitudinally fixed, and a tool-supporting carriage freely adjustable along the tool-carrying member under the manual grasp of the operator.

7. In a stone surfacing machine, the combination with a pressure-fluid-operated, percussive, cutting tool, of a central support, a sleeve mounted to turn and slide on said support, an overhanging tool-carrying arm longitudinally adjustable on said central support, means for holding said tool carrying arm longitudinally fixed, means for holding said arm in fixed vertical position, a tool holder, grasping means upon said tool holder, and means permitting the free longitudinal adjustment of said tool holder along said arm under the manual grasp of the operator.

8. In an apparatus of the class described, the combination with an upright standard, a tool-carrying-supporting arm composed of parallel members suitably spaced and arranged on either side of said standard, means permitting the longitudinal adjustment of said arm relatively to said standard, means for holding the same in any given position of longitudinal adjustment, and means for rendering the holding means effective or ineffective at will.

9. In an apparatus of the class described, the combination with a pressure-fluid-operated, percussive, cutting tool, of upright supporting means, a laterally extending tool-supporting member carried by the same, flexible connections for vertically adjusting said supporting member on said supporting means, and means controllable at a point remote from said supporting means for controlling said flexible connections and thereby the vertical adjustment of said laterally extending member.

10. In a stone surfacing machine, the combination with a pressure-fluid-operated, percussive, cutting tool, of upright supporting means, a laterally extending tool-supporting arm carried thereby, flexible connections for raising or lowering said arm vertically to adjust the same, and means accessible at the tool-carrying end of said arm for controlling said flexible connections.

11. In an apparatus of the class described, the combination with central supporting means, a laterally extending tool-supporting arm, a flexible connection by which the same is suspended from said supporting means, and means controllable at or adjacent the outer end of said arm for winding in or unwinding said flexible connection to adjust said arm vertically.

12. In an apparatus of the class described, the combination with central supporting means, a longitudinally adjustable tool-carrying arm supported thereby, flexible connections between said arm and the said supporting means, and means controllable at or near the tool-carrying end of said arm and operatively related to said flexible connections for vertically adjusting said arm relatively to said supporting means.

13. In an apparatus of the class described, the combination with central supporting means, of a longitudinally adjustable tool-carrying arm supported thereby, a supporting flexible connection for raising or lowering said arm, and a device for taking in or letting out said flexible connection positioned upon said arm.

14. In an apparatus of the class described, the combination with central supporting means, of a longitudinally adjustable arm carried thereby, means for supporting said arm comprising a flexible connection suitably guided by sheaves, the latter supported near the upper portion of said supporting means, said flexible connection having one end attached to a part upon said supporting arm, and a winding drum engaging the opposite end of said flexible connection and secured adjacent the opposite end of said arm, whereby the arm may be adjusted longitudinally without affecting the vertical adjustment and vice versa.

15. In a stone surfacing machine, the combination with a pressure-fluid-operated, percussive cutting tool of an upright supporting standard, a main carriage vertically adjustable upon the same and adapted also to turn about said standard, a laterally extending arm supported by said carriage but adapted to be adjusted longitudinally upon the same, said carriage and said arm being freely movable about the standard by the operator when positioned at the end of the arm, means relatively remote from the standard for vertically adjusting the said arm and carriage, and means operable from a point relatively remote from the standard for holding said arm longitudinally fixed.

16. In an apparatus of the class described, the combination with a central support, a laterally extending, longitudinally adjustable, tool-carrying arm sustained thereby, vertically and laterally extending flexible connections connected to opposite ends of the arm for vertically adjusting the same while permitting free, longitudinal adjustment thereof, means accessible to the operator and relatively remote from the central support for controlling the vertical adjustment of said arm, and similar means similarly located for controlling the longitudinal adjustment thereof.

17. In an apparatus of the class described, the combination with a support, a radial tool-carrying member sustained thereby, a pressure-fluid-actuated tool carried by said member, means permitting the turning of said tool relatively to said member and means for supplying pressure fluid centrally to said tool and substantially coincident with the turning axis thereof.

18. In an apparatus of the class described, the combination with a central support, a laterally extending tool-carrying member, a power-actuated tool carried thereby having a plurality of cutting units, and means permitting said tool with said cutting units to be swung about said support at a central position upon said supporting member, while, at the same time, to be moved relatively to said supporting member to maintain the resulting lines of cut in desired alinement.

19. In an apparatus of the class described, the combination with a power-actuated tool having a plurality of separate cutting units held in fixed relative position, a support, a laterally extending tool-supporting member secured to said support, and means permitting the said tool to be turned bodily about its attachment to the laterally extending member, and means also for permitting the latter to be turned about the support.

20. In an apparatus of the class described, the combination with a support, a supporting arm adapted to be swung in the arc of a circle, a tool having a plurality of separate cutting units, said tool being carried by said arm, and means to turn said tool and said cutting units together upon the said arm.

In testimony whereof, I have signed my name to this specification, in the presence of two subscribing witnesses.

GEO. H. GILMAN.

Witnesses:
GEO. E. WOLCOTT,
F. C. BRITTON.

Copies of this patent may be obtained for five cents each, by addressing the "Commissioner of Patents, Washington, D. C."